(No Model.)

S. D. PALMER.
VEHICLE SPRING.

No. 548,085. Patented Oct. 15, 1895.

WITNESSES:
Fred G. Dieterich
Edw. W. Byrn.

INVENTOR
States D. Palmer.
BY
ATTORNEYS.

ANDREW B. GRAHAM, PHOTO-LITHO. WASHINGTON, D.C.

UNITED STATES PATENT OFFICE.

STATES D. PALMER, OF MARSHALLTOWN, IOWA.

VEHICLE-SPRING.

SPECIFICATION forming part of Letters Patent No. 548,085, dated October 15, 1895.

Application filed October 15, 1894. Serial No. 525,912. (No model.)

*To all whom it may concern:*

Be it known that I, STATES D. PALMER, residing at Marshalltown, in the county of Marshall and State of Iowa, have invented a new and Improved Vehicle-Spring, of which the following is a specification.

My invention relates to that form of spring chiefly used in the construction of road-carts and other vehicles, and which acts by tension as a supporting device and is constructed as a double-ended coil, having at each end a hook or eye for connecting it to the parts to which it is to be applied. With this form of spring the ends of the coil are attached usually to the terminal ends by winding the ends into a swiveling collar or wrap around the eyebolt, and the objection to this is that there is so much looseness as to make a great deal of rattling noise. It has been sought to obviate this and make a tight connection at the ends by means of eyebolts that turn into nuts inserted within the ends of the coils; but this, in turn, is objectionable, because the nuts are liable to become loose unless they are riveted on, and it is very difficult to rivet the nuts on within the complete inclosure or cage of the spring, it being only practical to do so by spreading apart the coils of the spring and working to great disadvantage. My invention is designed to overcome all these difficulties and to provide a tight and antirattling connection for the eyes that needs no riveting on the one hand and is not liable to get loose on the other; and to this end it consists in providing the ends of the coils with a construction of nut-lock, the nuts being placed in the coils and shaken into their locking position in the ends of the coils, so as to enable the eyebolt to be screwed into the same without allowing the nuts to turn while screwing in the eyebolt, and which construction also permanently locks the nut, so that it can never come off accidentally and always holds the eyebolt in place with a tightly-clamped and noiseless connection, as will be hereinafter fully described.

Figure 1:
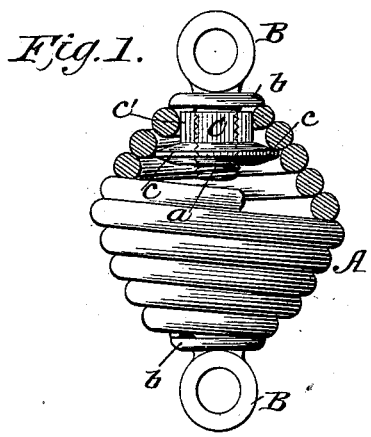
Figure 2:
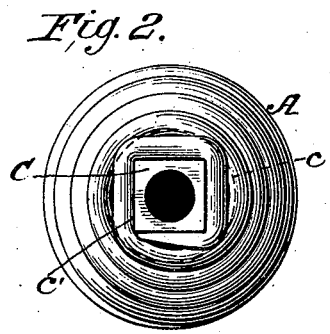
Figure 3:
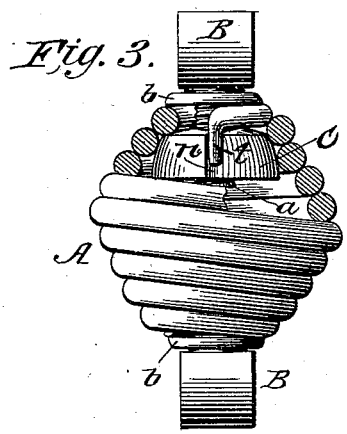

Figure 1 is a side view of one of my improved springs with one end broken away. Fig. 2 is an end view of the same with the eyebolt removed. Fig. 3 is a side view with one end broken away, showing a modification; and Fig. 4 is an end view of the same with the eyebolt removed.

In the drawings, A represents a double conical coil-spring having an eyebolt B in each end. This eyebolt has a screw-threaded end $a$ and a shoulder $b$, and its screw-threaded end turns into a nut C within the coil-spring. This nut has a flange $c$ fitting against the inside ends of the spring, and also a square projection $c'$, around which the final wrap of the coil-spring fits with a corresponding square shape, causing the nut when in place to be locked against turning. When the coil-spring is being wound, the two nuts are inserted, and after the spring is wound around a suitable former the nut is shaken into position in the end of the coil until the square projection of the nut enters the square wrap of the final convolution of the spring, and the eyebolt is then screwed into the nut and the end of the spring is tightly clamped and held between the shoulder $b$ of the eyebolt and the flange $c$ of the nut. The construction thus made is perfectly tight and non-rattling, and the nut is effectually locked against accidentally turning off the bolt.

Figure 4:
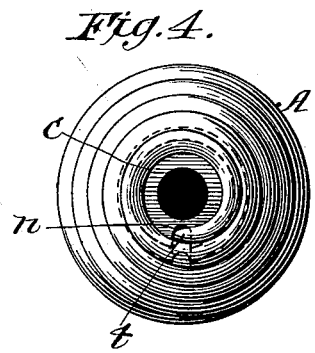

I do not confine myself to the square wrap of the end of the coil as a means for locking the nut, as any other angular wrap and corresponding shape of nut would accomplish the same result, and I may furthermore lock the nut by simply providing a notch $n$ in the side, as in Figs. 3 and 4, and give a final inward turn $t$ to the end of the coil, so that when the nut is shaken down to its position the inturned end $t$ will enter the notch $n$ of the nut and lock the nut against turning upon the same principle before described.

Having thus described my invention, what I claim, and desire to secure by Letters Patent, is—

1. A coiled spring having closed ends, combined with a nut arranged within the coiled spring and rigidly locked to the same against turning and having a screw threaded hole in the same, and an eye bolt having its eye arranged outside of the coil spring, and its screw threaded end entered into and secured by the screw threaded hole in the nut within the coil substantially as and for the purpose described.

2. A coiled spring having closed ends with an angular seat or opening, combined with an interior nut having a screw threaded hole in it, and an angular projection fitting in said seat, and rigidly locked by the same against turning, and an eye bolt having its eye outside the coil spring and a threaded end entered into and secured by the nut within the coil spring, substantially as shown and described.

3. A coiled spring having closed ends with an angular seat or opening, combined with an interior nut having a screw threaded hole in it, an angular projection on one side fitting within the angular seat and a bearing flange on its inner face, and an eye bolt having outside the coil spring an eye and a shoulder fitting against the outer surfaces of the coils, and having also a screw threaded end penetrating and secured by the screw threaded hole in the seat within the coil spring, substantially as shown and described.

STATES D. PALMER.

Witnesses:
NELLIE BROWN,
D. T. DENMEAD.